US009852028B2

(12) United States Patent
Goel

(10) Patent No.: US 9,852,028 B2
(45) Date of Patent: Dec. 26, 2017

(54) MANAGING A COMPUTING SYSTEM CRASH

(71) Applicant: International Business Machines Corporation, Armonk, NY (US)

(72) Inventor: Prateek Goel, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 187 days.

(21) Appl. No.: 14/691,691

(22) Filed: Apr. 21, 2015

(65) Prior Publication Data

US 2016/0314045 A1    Oct. 27, 2016

(51) Int. Cl.
| | | |
|---|---|---|
| *G06F 11/00* | (2006.01) | |
| *G06F 11/14* | (2006.01) | |
| *G06F 11/07* | (2006.01) | |
| *G06F 11/30* | (2006.01) | |
| *G06F 11/34* | (2006.01) | |

(52) U.S. Cl.
CPC ...... *G06F 11/1441* (2013.01); *G06F 11/0778* (2013.01); *G06F 11/0793* (2013.01); *G06F 11/1417* (2013.01); *G06F 11/302* (2013.01); *G06F 11/3495* (2013.01); *G06F 2201/805* (2013.01); *G06F 2201/85* (2013.01); *G06F 2201/86* (2013.01)

(58) Field of Classification Search
CPC ............. G06F 11/0721; G06F 11/0778; G06F 11/1417; G06F 11/0712; G06F 11/0793; G06F 2009/45579; G06F 2009/45587; G06F 2009/45583; G06F 2009/45591
See application file for complete search history.

(56) References Cited

U.S. PATENT DOCUMENTS

| | | | | |
|---|---|---|---|---|
| 5,126,972 A | * | 6/1992 | Abe ...................... | G06F 11/364 365/189.011 |
| 6,088,777 A | * | 7/2000 | Sorber ................. | G06F 9/5016 370/381 |
| 6,345,367 B1 | * | 2/2002 | Sinclair ................. | G11C 29/70 711/100 |
| 6,785,763 B2 | * | 8/2004 | Garnett ............... | G06F 13/4027 711/144 |
| 7,831,857 B2 | | 11/2010 | Muppirala et al. | |
| 8,453,015 B2 | * | 5/2013 | Ponnuswamy ..... | G06F 11/0778 714/38.11 |
| 8,762,790 B2 | * | 6/2014 | McCoy ................. | G06F 11/079 714/38.1 |

(Continued)

*Primary Examiner* — Bryce Bonzo
*Assistant Examiner* — Jeison C Arcos
(74) *Attorney, Agent, or Firm* — Lieberman & Brandsdorfer, LLC

(57) ABSTRACT

A system and a computer program product for managing a computing system crash. Memory of the computing system is separated into at least two classifications, referred to herein as a dumpable area and a non-dumpable area. Upon detection of an operating system crash in the computing system, an operating system module prevents a dumping operation of the memory, including preventing access to the dumpable memory area, and divides the non-dumpable area into a new dumpable area and a new non-dumpable area. At such time as the operating system is rebooted, the dumping operation is initiated and completed in the dumpable area, and resumed operations use the non-dumpable area.

15 Claims, 4 Drawing Sheets

(56) References Cited

U.S. PATENT DOCUMENTS

| | | | |
|---|---|---|---|
| 9,047,187 B2* | 6/2015 | Guo | G06F 11/073 |
| 2004/0153834 A1* | 8/2004 | Oshima | G06F 11/0751 |
| | | | 714/38.11 |
| 2007/0074065 A1* | 3/2007 | Suzuki | G06F 11/1658 |
| | | | 714/5.1 |
| 2007/0220350 A1* | 9/2007 | Ogasawara | G06F 11/0712 |
| | | | 714/38.11 |
| 2008/0133968 A1* | 6/2008 | Muppirala | G06F 11/0778 |
| | | | 714/13 |
| 2008/0270994 A1* | 10/2008 | Li | G06F 11/366 |
| | | | 717/128 |
| 2010/0162239 A1* | 6/2010 | Wires | G06F 17/30067 |
| | | | 718/1 |
| 2011/0154133 A1 | 6/2011 | Ganti et al. | |
| 2012/0131380 A1* | 5/2012 | Horman | G06F 11/1415 |
| | | | 714/6.1 |
| 2014/0040671 A1 | 2/2014 | Akirav et al. | |
| 2014/0149799 A1 | 5/2014 | Buendgen et al. | |
| 2016/0012246 A1* | 1/2016 | Allen | G06F 21/6218 |
| | | | 726/17 |

* cited by examiner

MANAGING A COMPUTING SYSTEM CRASH

BACKGROUND OF THE INVENTION

Today's business environment requires that computing systems are constantly up and running. However, in the case of a system crash, the systems should be up and running as fast as possible. Whenever a system crashes, dump framework is invoked and starts collecting the information from all the components as to what memory locations need to be dumped. Generally, one of the following two approaches is selected. In the first approach, after the computing system crash, first the dump is completed and subsequently the computing system is restarted. In the second approach, a minimal startup of the computing system is initiated and then the dump is initiated and completed Until the dump is completed, a user does not get access to the computing system. Application availability is hampered in both the approaches.

SUMMARY

The invention includes a system and computer program product for providing availability of a computing system in case of a computing system crash.

A system and a computer program product are provided for managing a computing system crash. Memory of the computing system is divided into a dumpable area and a non-dumpable area. An operating system crash in the computing system is detected and a response to the detection is processed. More specifically, the crash response includes rebooting the operating system using the non-dumpable area while blocking access to the dumpable area until the rebooting of the operating system is completed.

These and other features and advantages will become apparent from the following detailed description of the presently preferred embodiment(s), taken in conjunction with the accompanying drawings.

BRIEF DESCRIPTION OF THE DRAWINGS

The drawings referenced herein form a part of the specification. Features shown in the drawings are meant as illustrative of only some embodiments, and not of all embodiments unless otherwise explicitly indicated.

DETAILED DESCRIPTION

Figure 1:
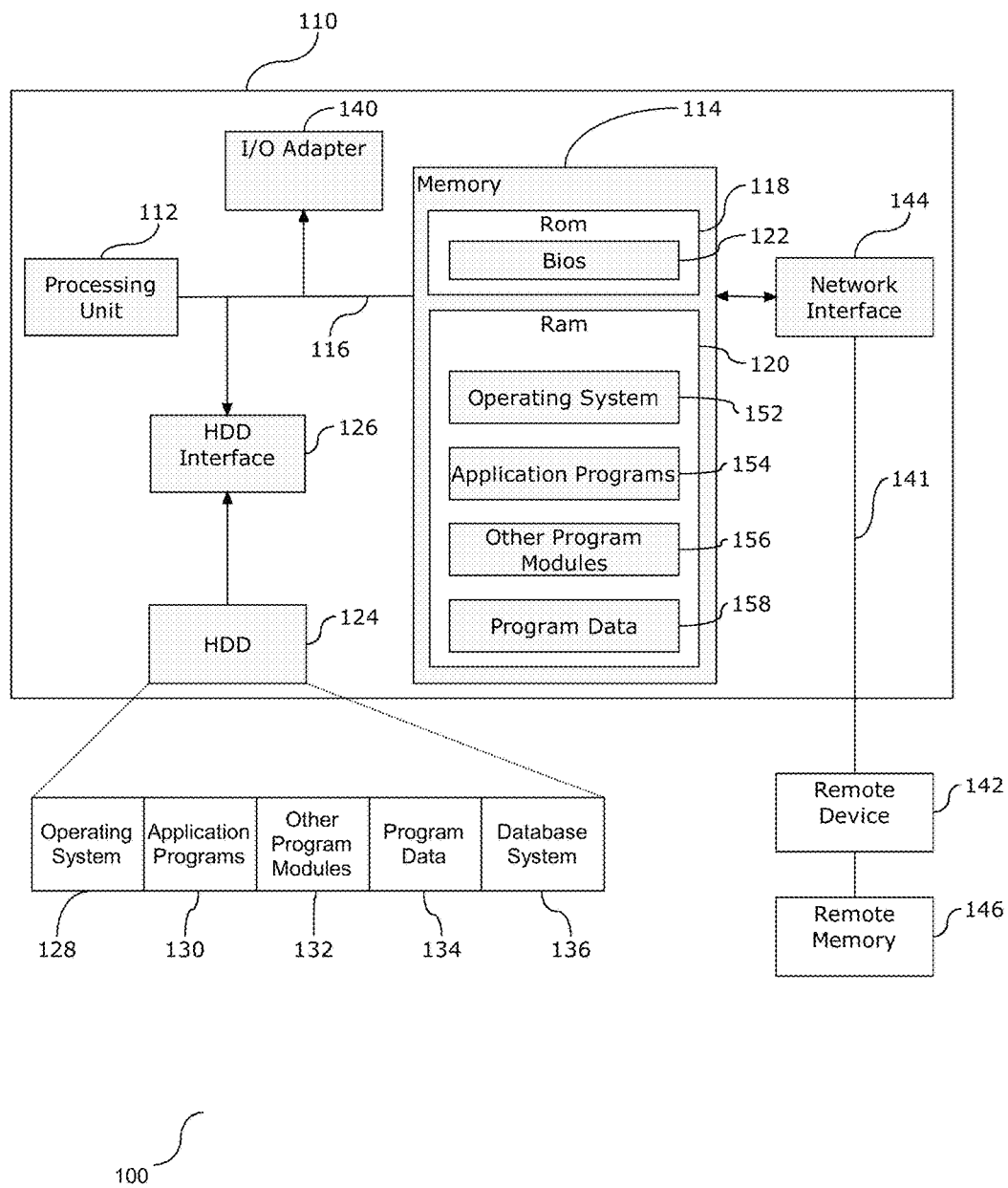
FIG. 1 is a block diagram depicting a computing system in which embodiments may be implemented.

As will be appreciated by one skilled in the art, embodiments may be embodied as a system, method or computer program product. Accordingly, embodiments may take the form of an entirely hardware embodiment, an entirely software embodiment (including firmware, resident software, micro-code, etc.) or an embodiment combining software and hardware embodiments that may all generally be referred to herein as a "circuit," "module" or "system." Furthermore, embodiments may take the form of a computer program product, embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

FIG. 1 illustrates a block diagram (100) of a computing system for implementing an embodiment. The computing system includes a computing device (110), which in turn includes a processing unit (112), a system memory (114), and a system bus (116) that couples various system components including the system memory (114) to the processing unit (112). The system bus (116) may be any of several types of bus architectures, including a memory bus, a memory controller, a peripheral bus, and a local bus using any of a variety of bus architectures, such as PCI. The system memory (114) includes a Read Only Memory (ROM) (118) and a Random Access Memory (RAM) (120). The RAM is in communication with an operating system (152), an applications program (154), other program modules (156), and program data (158). A Basic Input/Output System (BIOS) (122) is included as shown herein, containing the basic routines that help to transfer information between elements within the computing device (110), such as during start-up, is stored in the ROM (118). The computing device (110) further includes a Hard Disk Drive (HDD) (124) as computer-readable storage media. The HDD (124) is connected to the system bus (116) by an HDD interface (126). The HDD (124) provides a non-volatile storage for computer-readable instructions, data structures, program modules, and other data for the computing device (110). Although the exemplary environment described herein employs the HDD (124), it should be appreciated by those skilled in the art that other types of computer-readable storage media, which can store data that is accessible by computer, such as RAM, ROM, removable magnetic disks, removable optical disks, and the like may also be used in the exemplary operating environment.

A number of program modules may be stored on the HDD (124), including an operating system (128), one or more application programs (130), other program modules (132), program data (134), and a database system (136). The operating system (128), the one or more application programs (130), the other program modules (132) and program data (134) may be loaded onto the system memory (114) and specifically onto the RAM (120) during the functioning of the computing device (110). A user may provide commands and information through input devices, such as a keyboard, and receive output through peripheral output devices, such as monitor, speaker, printer, etc. These input and output devices are often connected to the processing unit (112) through an I/O adapter (140) coupled to the system bus (116).

In a networked environment, the computing device (110) may be connected to a remote computing device (142) through a network interface card (144). It will be appreciated that the network connections shown are exemplary, and any conventional means (141) of establishing communications links between the computers, such as a local area network, wide area network or wireless connection, may be used. In a networked environment, program modules depicted relative to the computing device (110), or its components, may be stored in a remote memory (146). The remote computing device (142) may be a personal computer, a router, a server, a network PC, a peer device, or other common network device.

Those of the ordinary skill in the art will appreciate that the hardware in FIG. 1 is a basic computing system and may vary. The architecture of the aforementioned computing device is not limiting and is only depicted as an example on which an embodiment may be implemented. Other types of computing systems such as a smart phone or a web-kiosk are well within the intended scope on which an embodiment may be implemented.

In the context of this description, the following conventions, terms and/or expressions may be used:

The term 'dump' or 'dumping operation' may include information such as, for example, status of a kernel and potentially related software subsystems of an operating system, processor register values and status of kernel processes at or just before the time of the computing system crash. The operating system dump may be performed as storing a data file to a non-volatile storage system, e.g., a hard drive for later analysis.

The term 'memory' includes a continuous memory area accessible by the processor of a computing system. Today, main memory cells may be operated as RAM (random access memory) which may be addressable by the related processor.

The term 'computing system' includes any computer device comprising at least a processor, main memory, input/output elements and a long-term storage or a cloud computing system.

The term 'operating system crash' includes a sudden failure of the operating system resulting in a "frozen" display showing some information or an automatic reboot. An operating system crash is also known as a "system crash", "Blue Screen of Death" (named after the information screen on "Microsoft Windows", and "Kernel Panic" (or just "Panic" for short). A "kernel" is essentially the core of an operating system which handles main functions. It contains the native kernel environment that implements services exposed to applications in user space and provides services for writing kernel extensions. The term "native" can be used as a modifier to refer to a particular kernel environment. AIX, Linux, and Windows 2000 all have distinct native kernel environments; they are distinct because they each have a specific set of application program interfaces (API) for writing subsystems (such as network adapter drivers, video drivers, or kernel extensions).

The term 'booting' includes loading an operating system into main memory of a computer or computing system and starting execution of the operating system such that the operating system may control the operation of the computing system after the booting. Booting may be in contrast to the term 'loading' and/or 'activating'. A booting may require a loading of the operating system into the main memory and also an activation of the operating system so that it starts execution and controlling of the core functions of the computing system. This means that the loaded operating system may stay inactive before the activation. In one embodiment, activation may also be denoted as a 'warm boot' without a reload of the operating system.

Figure 2:
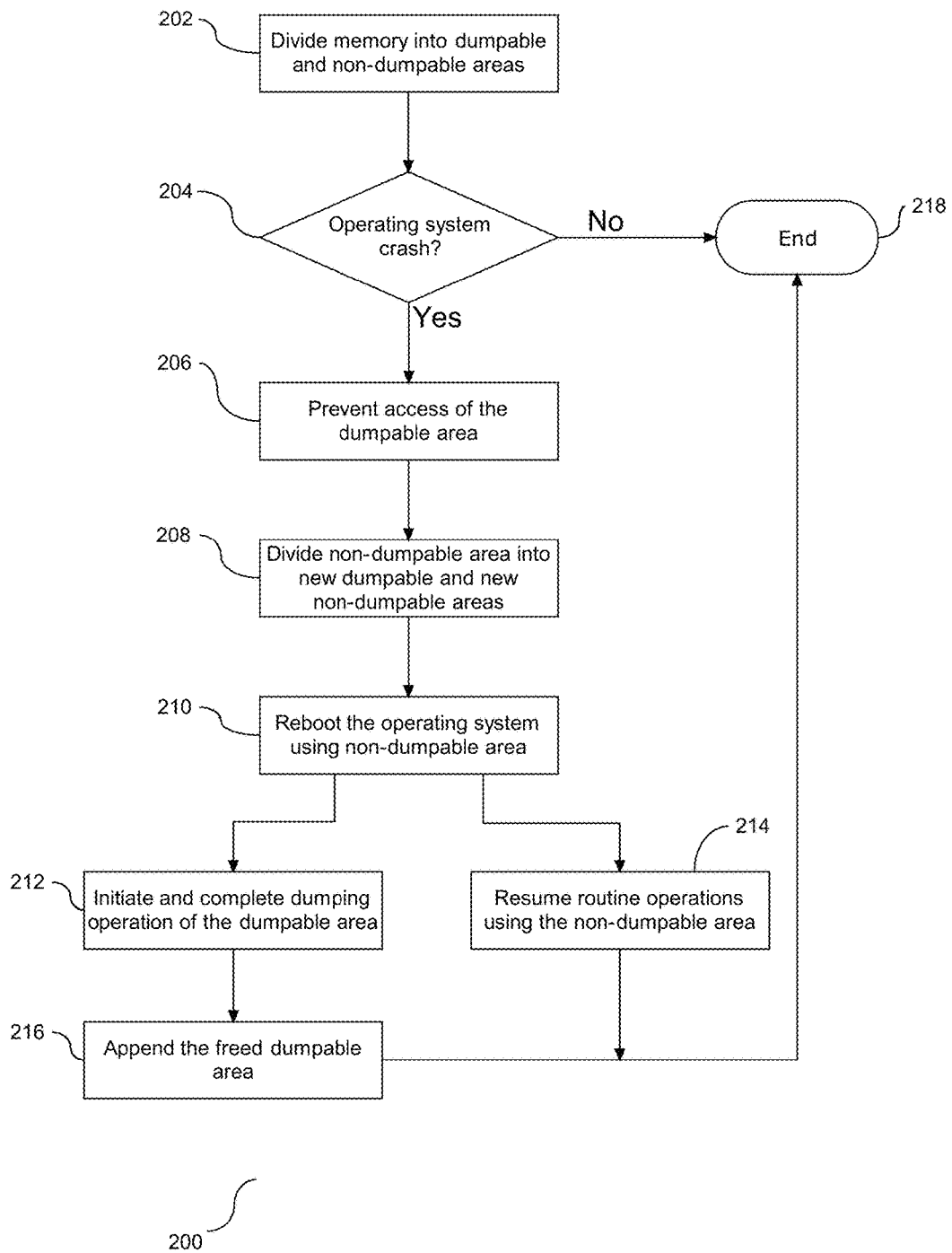
FIG. 2 is a flowchart depicting steps to be performed for implementing an embodiment.

FIG. 2 illustrates a flowchart (200) depicting steps to be performed for implementing an embodiment. At step (202), as shown in FIG. 2, the memory is logically divided into a dumpable area and a non-dumpable area. The division ratio may be pre-determined. For example, in one embodiment, the division ratio may be 40:60 dumpable: non-dumpable although the division ratio should not be considered limiting. Such a division may be performed using one or more computer programs known to a person skilled in the art. In one embodiment, the aforementioned division may be performed at the time of installing the operating system in the computing system. At step (204), if a Basic Input/Output System (BIOS), or a hypervisor if the computing system is a cloud computing system, detects an operating system crash, steps (206)-(210) are performed. According to an embodiment, a specific module comprising computer program instructions/codes within the BIOS or hypervisor may be created and configured to perform steps (206)-(210). Step (218) in the flow chart denotes taking no action when no operating system crash is detected. Generally, whenever an operating system crashes, a dumping operation of the memory is initiated. However, a user may prefer to resume routine operations without having to wait for the dumping operation to finish. Accordingly, to mitigate issues associated with the dumping operation, upon detecting the operating system crash, such a dumping operation is prevented from being initialized and is postponed until the operating system is rebooted.

Prevention of the dumping operation prohibits, e.g. blocks, access to the dumpable area of memory (206). Specifically, at step (206) the operating system is prevented from accessing the dumpable area of the memory until the operating system is rebooted. To support routine operations once the dumping operation is initialized, the non-dumpable area is divided into a new dumpable area and a new non-dumpable area (208), as further described below and shown in FIG. 4. The operating system is then rebooted using the non-dumpable area of the memory exclusively (210). The ratio of the division of the new dumpable and new non-dumpable areas may be kept same as the earlier division ratio, or in one embodiment, a new or different ratio may be employed for dividing the memory into dumpable and non-dumpable areas.

After the operating system is rebooted, the dumping operation of the dumpable area is initiated and completed (212). Thus, according to the aforementioned method, recovery from the crash is quick while also providing enough memory to the computing system, in the form of non-dumpable area, to allow a user of the computing system to resume routine operations without having to wait for the dumping operating to finish (216). As shown herein, completion of the dumping at step (212) takes place in parallel with resuming routine operations at step (216). Accordingly, the parallel actions provide efficiency pertaining to the continued operations while supporting dumping.

According to a preferred embodiment, while the dumping operation is being executed, the dumpable area being freed is dynamically appended to the new dumpable or new non-dumpable areas or both (214). Upon completion of the dumping operation, the ratio of the new dumpable and new non-dumpable area is similar to the ratio of the dumpable and non-dumpable areas prior to the operating system crash. Accordingly, the status of the memory before the operating system crash is restored after the operating system crash.

Figure 3:
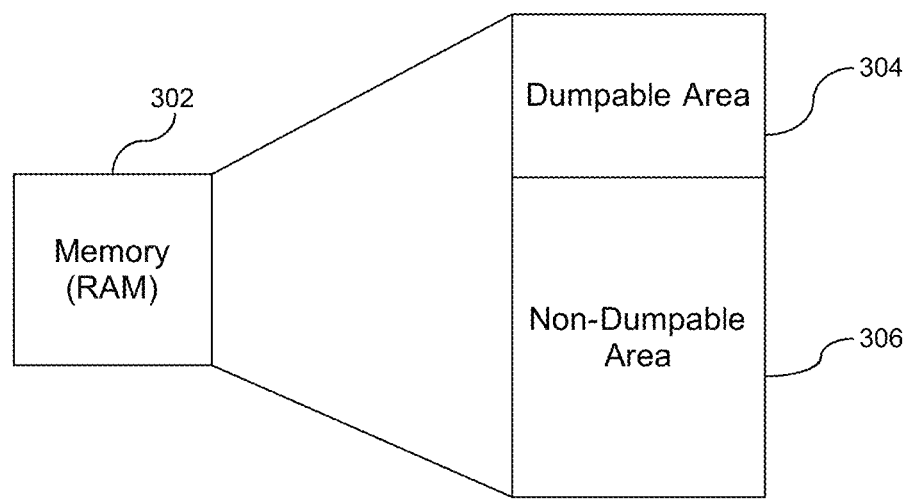
FIG. 3 is a block diagram depicting a memory mapping of a logical partition in a computing system prior to an operating system crash in the computing system.
Figure 4:
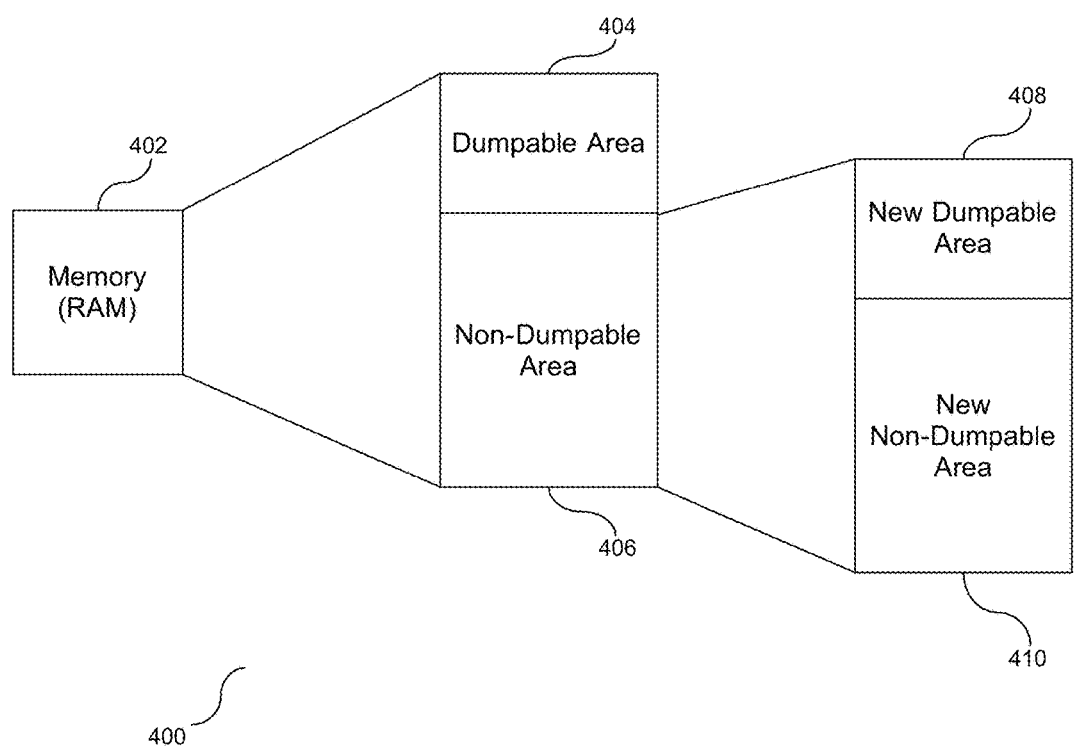
FIG. 4 is a block diagram depicting a memory mapping of a logical partition in a computing system post the operating system crash in the computing system.

FIG. 3 illustrates a block diagram (300) depicting a memory mapping of a logical partition in a computing system prior to an operating system crash in the computing system. As described in FIG. 2, memory (302) is logically divided into a dumpable area (304) and a non-dumpable area (306). FIG. 4 illustrates a block diagram (400) depicting a memory mapping of a logical partition in a computing system post an operating system crash in the computing system. As described in FIG. 2, memory (402) is logically divided into a dumpable area (404) and a non-dumpable area (406). The non-dumpable area (404) is further divided into a new dumpable area (408) and a new non-dumpable area (410).

The flowchart and block diagrams in the Figures illustrate the architecture, functionality, and operation of possible implementations of systems, methods and computer program product according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computing system for managing a computing system crash, the computing system comprising a computer infrastructure operable to:
   divide a memory of the computing system into a first area and a second area;
   detect an operating system crash in the computing system;
   initialize a dumping operation of the first area;
   divide the second area into a new first area and a new second area;
   free the first area, the freed first area becoming freed memory;
   reboot the operating system using the new second area, wherein access to the new first area is blocked until the rebooting is completed; and
   resume one or more operations following the reboot, the resumed operations using the new second area.

2. The system of claim 1, further comprising to initiate and complete the dumping operation in the new first area after the operating system is rebooted, the new first area becoming freed memory upon completion of the dumping operation.

3. The system of claim 2, further comprising to restore a status of the operating system after the crash, including to dynamically append the freed memory to an area selected from the group consisting of: the new first area, the new second area, and combinations thereof.

4. The system of claim 3, further comprising to match a division ratio of the new first and the new second areas to a division ratio of the first and second areas.

5. The system of claim 1, further comprising to configure a module within a Basic Input/Output System (BIOS), and the module to respond to the detected crash.

6. The system of claim 1, further comprising to configure a module within a hypervisor of a cloud computer system managing one or more virtual machines, and the module to respond to the detected crash.

7. A computer program product, comprising a non-transitory computer readable storage medium having readable program code embodied in the storage medium, the computer program product comprises at least one component operable to: divide a memory of the computing system into a first area and a second area; detect an operating system crash in the computing system; initialize a dumping operation of the first area divide the second area into a new first area and a new second area; free the first area, the freed first area becoming freed memory; reboot the operating system using the new second area, wherein access to the new first area is blocked until the rebooting is completed; resume one or more operations following the reboot, the resumed operations using the new second area.

8. The computer program product of claim 7, further comprising to initiate and complete a dumping operation in the new first area after the operating system is rebooted, the new first area becoming freed memory upon completion of the dumping operation.

9. The computer program product of claim 8, further comprising to restore a status of the operating system after the crash, including to dynamically append the freed memory to an area selected from the group consisting of: the new first area, the new second area, and combinations thereof.

10. The computer program product of claim 9, further comprising to match a division ratio of the new first and the new second areas to a division ratio of the first and second areas.

11. The computer program product of claim 7, further comprising to configure a module within a Basic Input/Output System (BIOS), and the module to respond to the detected crash.

12. The system of claim 1, wherein the dumping operation of the first area is in parallel with the rebooting of the operating system in the second area.

13. The computer program product of claim 7, wherein the dumping operation of the first area is in parallel with the rebooting of the operating system in the second area.

14. The system of claim 1, further comprising to append all freed memory and return the memory of the computer system to an initial state comprising the first area and the second area.

15. The computer program product of claim 7, further comprising to append all freed memory and return the memory of the computer system to an initial state comprising the first area and the second area.

* * * * *